(12) United States Patent
Tan

(10) Patent No.: US 11,580,211 B2
(45) Date of Patent: Feb. 14, 2023

(54) INDICATION FOR MULTI-FACTOR AUTHENTICATION

(71) Applicant: Synaptics Incorporated, San Jose, CA (US)

(72) Inventor: Yeh-Cheng Tan, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 225 days.

(21) Appl. No.: 16/909,844

(22) Filed: Jun. 23, 2020

(65) Prior Publication Data

US 2021/0397692 A1 Dec. 23, 2021

(51) Int. Cl.
*G06F 21/40* (2013.01)
*G06F 21/36* (2013.01)
*G06F 21/32* (2013.01)

(52) U.S. Cl.
CPC .............. *G06F 21/40* (2013.01); *G06F 21/32* (2013.01); *G06F 21/36* (2013.01)

(58) Field of Classification Search
CPC ........... G06F 21/40; G06F 21/32; G06F 21/36
See application file for complete search history.

(56) References Cited

U.S. PATENT DOCUMENTS

| | | | | |
|---|---|---|---|---|
| 9,349,035 | B1 * | 5/2016 | Gerber | G06V 40/13 |
| 9,519,769 | B2 * | 12/2016 | Azar | H04L 63/0861 |
| 10,778,673 | B2 * | 9/2020 | Bhargava | H04L 63/0861 |
| 10,860,840 | B2 * | 12/2020 | Hassan | G06V 40/172 |
| 2016/0191515 | A1 * | 6/2016 | Kim | G06V 10/811 |
| | | | | 726/6 |
| 2016/0350548 | A1 * | 12/2016 | Lewis | G06F 3/04842 |
| 2017/0013462 | A1 * | 1/2017 | Jangi | H04W 12/062 |
| 2017/0063852 | A1 * | 3/2017 | Azar | G06V 40/70 |
| 2017/0083694 | A1 * | 3/2017 | Mardikar | G06V 40/28 |
| 2018/0260545 | A1 * | 9/2018 | Chen | G06F 3/0482 |
| 2018/0365477 | A1 * | 12/2018 | Seol | H04M 1/725 |
| 2019/0065714 | A1 * | 2/2019 | Adams | G06F 21/32 |
| 2020/0022085 | A1 * | 1/2020 | Zhang | H04W 52/0254 |
| 2020/0117780 | A1 * | 4/2020 | Kaladgi | G06F 21/40 |
| 2020/0137689 | A1 * | 4/2020 | Zhang | H04W 52/0254 |
| 2021/0152685 | A1 * | 5/2021 | Li | H04W 12/30 |

* cited by examiner

*Primary Examiner* — James R Turchen
(74) *Attorney, Agent, or Firm* — Paradice & Li LLP

(57) ABSTRACT

An input device configured for multi-factor authentication. The input device includes a plurality of sensor electrodes, one or more light sources, and an authentication component. The plurality of sensor electrodes is configured for capacitive sensing in a sensing region of the input device. The one or more light sources are configured to illuminate at least a portion of the sensing region of the input device. The authentication component is configured to receive a first authentication input via a first authentication device, determine whether the first authentication input matches a first credential of an authorized user, and selectively activate the one or more light sources based at least in part on whether the first authentication input matches the first credential of an authorized user.

20 Claims, 7 Drawing Sheets

INDICATION FOR MULTI-FACTOR AUTHENTICATION

TECHNICAL FIELD

The present implementations relate generally to user authentication, and specifically to indications for multi-factor authentication.

BACKGROUND OF RELATED ART

Authentication is a mechanism for verifying the identity of a user attempting to access a device and/or application. A basic form of authentication may require a user to input a username and password via an input device. However, usernames and passwords are easily stolen and can be used by unauthorized users to gain access to a corresponding device or application. Thus, modern authentication schemes increasingly rely on biometric sensors (e.g., sensors capable of identifying unique biological characteristics of the user) to provide greater levels of security. Example biometric sensors include fingerprint scanners, facial recognition systems, eye scanners, voice recognition systems, and the like. Biometric inputs typically require the user to physically interact with one or more sensors to perform authentication.

For enhanced security, some applications require multi-factor authentication. Multi-factor authentication requires a user to satisfy two or more "factors" or criteria for authentication. Example authentication factors can include something the user knows (e.g., username and password), something the user has (e.g., security token or device identifier), and something the user is (e.g., personal identifier or biometric). Because multi-factor authentication schemes require multiple different forms of verification, the false acceptance rate of a multi-factor authentication scheme may be significantly lower than that of any authentication scheme using only a single form of authentication. However, because multi-factor authentication also may require various types of user inputs, it may be desirable to notify or guide the user through the steps of the multi-factor authentication process.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in an input device including a plurality of sensor electrodes, one or more light sources, and an authentication component. The plurality of sensor electrodes is configured for capacitive sensing in a sensing region of the input device. The one or more light sources are configured to illuminate at least a portion of the sensing region of the input device. The authentication component is configured to receive a first authentication input via a first authentication device, determine whether the first authentication input matches a first credential of an authorized user, and selectively activate the one or more light sources based at least in part on whether the first authentication input matches the first credential of an authorized user.

Another innovative aspect of the subject matter of this disclosure can be implemented in a method of authentication. The method includes steps of receiving a first authentication input via a first authentication device, determining whether the first authentication input matches a first credential of an authorized user, and selectively illuminating a sensing region of the input device based at least in part on whether the first authentication input matches the first credential of an authorized user, where the sensing region is provide at least in part by a plurality of sensor electrodes configured for capacitive sensing.

Another innovative aspect of the subject matter of this disclosure can be implemented in an authentication system including a processing system and a memory. The memory stores instructions that, when executed by the processing system, causes the authentication system to receive a first authentication input via a first authentication device, determine whether the first authentication input matches a first credential of an authorized use, and selectively illuminate a sensing region based at least in part on whether the first authentication input matches the first credential of an authorized user, where the sensing region is provided at least in part by a plurality of sensor electrodes configured for capacitive sensing.

BRIEF DESCRIPTION OF THE DRAWINGS

The present implementations are illustrated by way of example and are not intended to be limited by the figures of the accompanying drawings.

DETAILED DESCRIPTION

Figure 1:
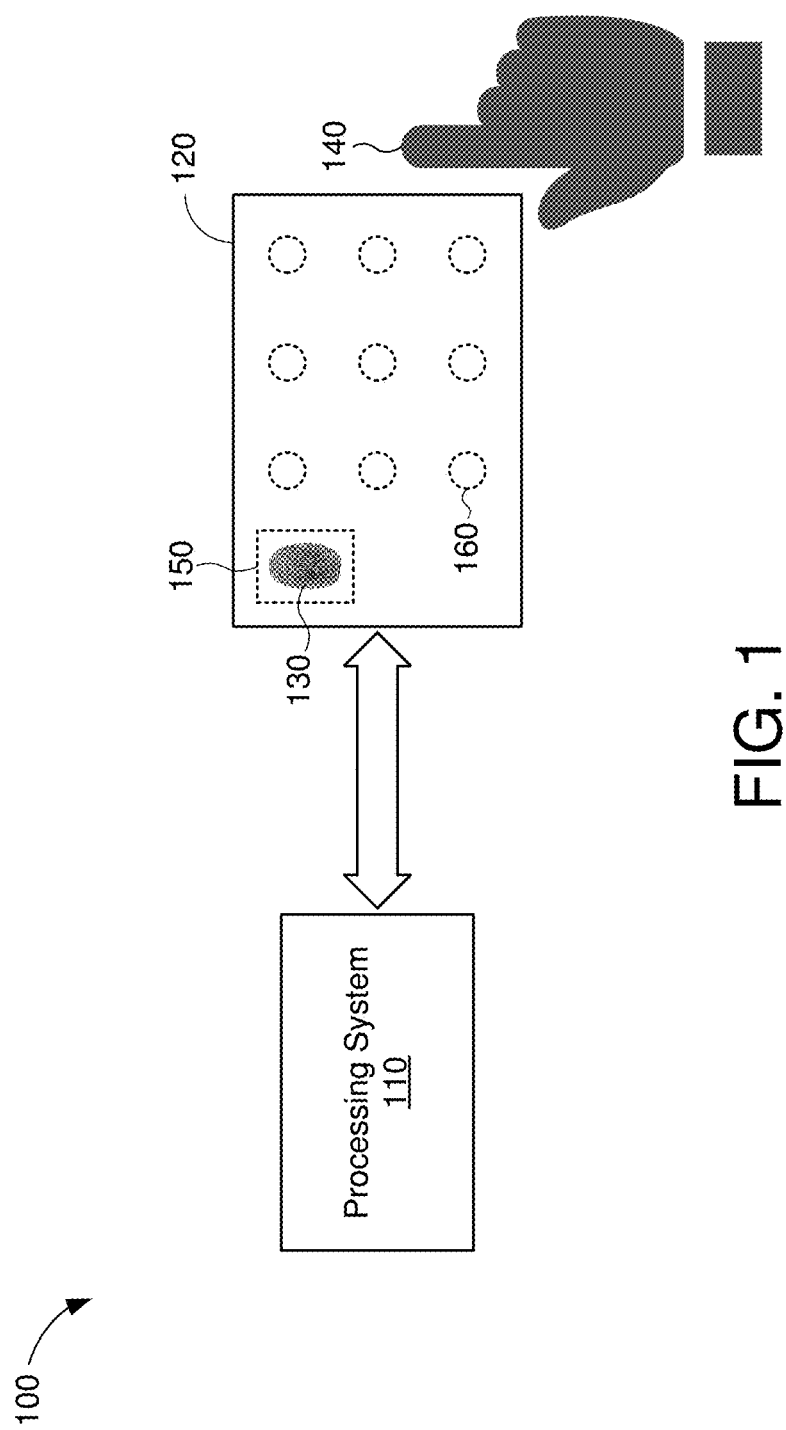
FIG. 1 shows an example input device which may be used with the present implementations.

Various implementations relate generally to input devices capable of multi-factor authentication. Some implementations more specifically relate to a visual aid for guiding user inputs through one or more steps of a multi-factor authentication process. In some implementations, the visual aid may be provided by one or more light sources configured to illuminate at least a portion of a sensing region of the input device. The sensing region may coincide with an array of sensor electrodes configured for capacitive sensing. The input device may further include an authentication component configured to receive a first authentication input via a first authentication device and determine whether the first authentication input matches a first credential of an authorized user. In some implementations, the authentication component may activate the one or more light sources responsive to determining that the first authentication input matches the first credential of an authorized user. When activated, the one or more light sources may project a pattern of illumination (such as a grid of dots) on an input surface associated with the sensing region.

Particular implementations of the subject matter described in this disclosure can be implemented to realize one or more of the following potential advantages. By selectively activating one or more light sources associated with a sensing region of the input device, aspects of the present disclosure may provide a visual guide for completing one or more steps of a multi-factor authentication process. For example, the one or more light sources may illuminate the sensing region to indicate where and/or how to complete the next step of the authentication process. In some aspects, the illumination may be used to indicate the type of user input required by the next step of the authentication process. For example, illuminating a sensing region configured for touch or proximity sensing may indicate that a gesture input is required. In some other aspects, a particular pattern of illumination may be used to guide the user in providing the required user input. For example, the user may provide the gesture input by tracing a finger or other input object over a grid of dots projected on the input surface associated with the sensing region.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors. The term "processor," as used herein may refer to any general-purpose processor, conventional processor, controller, microcontroller, special-purpose processor, and/or state machine capable of executing scripts or instructions of one or more software programs stored in memory.

FIG. 1 shows an example input device 100 which may be used with the present implementations. The input device 100 includes a processing system 110 and a sensing region 120. In some implementations, the input device 100 may be configured to provide input and/or control access to an electronic system (not shown for simplicity). Example electronic systems may include, but are not limited to, personal computing devices (e.g., desktop computers, laptop computers, netbook computers, tablets, web browsers, e-book readers, personal digital assistants (PDAs), and the like), composite input devices (e.g., physical keyboards, joysticks, key switches, and the like), data input device (e.g., remote controls, mice, and the like), data output devices (e.g., display screens printers, and the like), remote terminals, kiosks, video game machines (e.g., video game consoles, portable gaming devices, and the like), communication devices (e.g., cellular phones, smartphones, and the like), and media devices (e.g., recorders, editors, televisions, set-top boxes, music players, digital photo frames, digital cameras, and the like).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Example suitable technologies may include Inter-Integrated Circuit (I2C), Serial Peripheral Interface (SPI), PS/2, Universal Serial bus (SUB), Bluetooth®, Infrared Data Association (IrDA), and various radio frequency (RF) communication protocols defined by the IEEE 802.11 family of standards.

In the example of FIG. 1, the input device 100 may correspond to a proximity sensor device (e.g., also referred to as a "touchpad," "trackpad," or "touch sensor device") configured to sense input provided by one or more input objects 140 in the sensing region 120. Example input objects 140 include fingers, styli, and the like. In the example of FIG. 1, the input object 140 is depicted as a user's finger. However, in other implementations, any suitable input object may be used to provide user input via the sensing region 120. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some implementations, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some implementations, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some implementations, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastive, resistive, inductive, magnetic, acoustic, ultrasonic, thermal, and optical sensing technologies. In some implementations, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some implementations, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some implementations, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

The processing system 110 may be configured to operate the hardware of the input device 100 to detect input in the sensing region 120. In some implementations, the processing system 110 may control one or more sensor electrodes to detect objects and/or fingerprints in the sensing region 120. For example, the processing system 110 may be configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

The processing system 110 may be implemented as a set of modules that are implemented in firmware, software, or a combination thereof. Example modules include hardware operation modules for operating hardware such as one or more sensing elements; data processing modules for processing data such as sensor signals; and reporting modules for reporting information to other components of the electronic system such as a host processor or CPU. In some implementations, the processing system 110 may include sensor operation modules configured to operate sensing elements to detect user inputs in the sensing region 120; authentication modules configured to authenticate a user of the input device 100 and/or electronic system based at least in part on the user inputs; identification modules configured to identify gestures associated with certain user inputs; and mode changing modules for changing operation modes of the input device 100 and/or electronic system.

The input device 100 may include additional input components that can be operated by the processing system 110 or another processing system. In some implementations, the additional input components may include one or more biometric sensors that may be used to authenticate a user of the input device 100 or the corresponding electronic system. For example, a fingerprint sensor may use capacitive, optical, or ultrasonic fingerprint scanning technologies to detect and/or analyze a user's fingerprint 130 in a fingerprint scanning region 150 of the input device 100. In some implementations, the fingerprint scanning region 150 may coincide with, or substantially overlap, at least a portion of the sensing region 120 (such as shown in FIG. 1). In some other implementations, the fingerprint scanning region 150 may be separate from the sensing region 120.

The processing system 110 may respond to user input in the sensing region 120 and/or fingerprint scanning region 150 by triggering one or more actions. Example actions include changing an operation mode of the input device 100, authenticating a user of the input device 100, and/or graphical user interface (GUI) actions such as cursor movement, selection, menu navigation, and the like. In some implementations, the processing system 110 may determine positional information for a detected input. The term "positional information," as used herein, refers to any information describing or otherwise indicating a position or location of the detected input (e.g., within the sensing region 120). Example positional information may include absolute position, relative position, velocity, acceleration, and/or other types of spatial information. In some implementations, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120 and/or fingerprint scanning region 150. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode In some implementations, the processing system 110 may be configured to implement a multi-factor authentication scheme. As described above, multi-factor authentication requires a user to satisfy two or more "factors" or criteria for authentication. Example authentication factors can include something the user knows (e.g., username and password), something the user has (e.g., security token or device identifier), and something the user is (e.g., personal identifier or biometric). Thus, the processing system 110 may allow a user to access an electronic system only if the user can satisfy two or more authentication factors. In some implementations, at least one authentication factor may correspond to a touch or gesture input (e.g., something the user knows) provided via the sensing region 120. In the example of FIG. 1, another authentication factor may correspond to a fingerprint 130 (e.g., something the user is) provided via the fingerprint scanning region 150. In some other implementations, the multi-factor authentication scheme may include one or more authentication factors in lieu of, or in addition to, the user's fingerprint.

As described above, a multi-factor authentication operation may require different types of user inputs at different steps of the operation. For example, in a first step of a multi-factor authentication operation, the input device 100 may be configured to detect a fingerprint 130 in the fingerprint scanning region 150. In a second step of the multi-factor authentication operation, the input device 100 may be configured to detect a gesture input (e.g., a unique swipe pattern) in the sensing region 120. However, whether the multi-factor authentication operation proceeds to the second step is dependent upon whether the fingerprint 130 detected in the first step matches a fingerprint credential associated with a first authentication factor. Thus, it may be desirable to provide an indication of whether and/or how the second step of the multi-factor authentication operation is to be performed.

In some implementations, the input device 100 may include one or more light sources 160 to guide the user through a multi-factor authentication operation. The light sources 160 may include light emitting diodes (LEDs) or any other feasible light sources capable of emitting light in the visible spectrum. The light sources 160 may be configured to illuminate the sensing region 120 to indicate how and/or where the user is to provide an authentication input. For example, the processing system 110 may activate the light sources 160 in response to determining that the first step of the multi-factor authentication operation has been successfully completed. Thus, the activation of the light sources 160 may indicate that the input device 100 is configured to receive a gesture input, via the sensing region 120, associated with the second step of the multi-factor authentication operation.

The light sources 160 also may provide a visual aid for performing the authentication input. In some implementations, the light sources 160 may be configured to project a pattern of dots onto the input surface associated with the sensing region 120. In the example of FIG. 1, the dots are arranged in a grid pattern in a portion of the sensing region 120. However, in other implementations, the light sources 160 may be configured to project various other patterns of dots (or other shapes) onto the input surface. During the second step of the multi-factor authentication operation, the user may provide a gesture input by swiping or tracing the input object 140 over one or more of the dots projected on the input surface. The pattern of dots may function as a guide or boundary for performing gesture inputs in the sensing region 120. As a result, the dots may assist the user in performing gesture inputs that can be repeated consistently and accurately over multiple authentication attempts.

In some implementations, the processing system 110 may further deactivate the light sources 160 upon completing the second step of the multi-factor authentication operation. Aspects of the present disclosure recognize that the sensing region 120 may be various other user inputs (such as touch and gesture inputs) in addition to authentication inputs. Thus, it may not be desirable to display the dots on the input surface at all times. By selectively activating and deactivating the light sources 160 during the multi-factor authentication operation, the input device 100 may display the dots only when a gesture input is required during a corresponding step of the multi-factor authentication operation, and may hide the dots at other times (such as when the sensing region 120 is being used to provide positional information to an electronic system). The selective activation and deactivation of the light sources 160 may further increase user awareness about the current progress of the multi-factor authentication operation.

Figure 2:
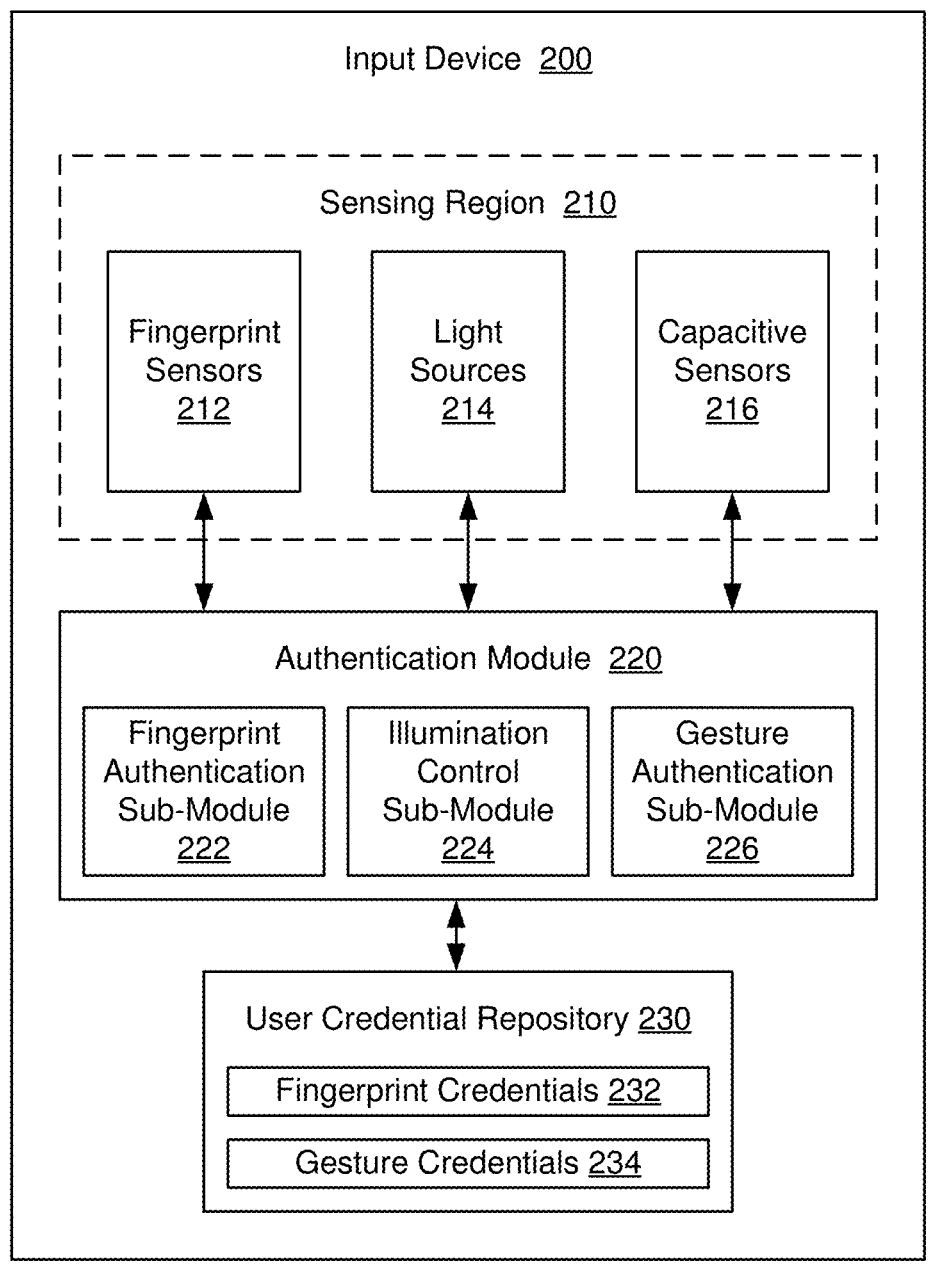
FIG. 2 shows a block diagram of an input device, in accordance with some implementations.

FIG. 2 shows a block diagram of an input device 200, in accordance with some implementations. In some implementations, the input device 200 may be one example of the input device 100 of FIG. 1. The input device 200 includes a sensing region 210, an authentication module 220, and a user credential repository 230. The sensing region 210 may encompass any space above, around, in, and/or proximate to the input device 200 in which the input device 200 is able to detect user input, such as provided by one or more input objects (not shown for simplicity). The size, shape, and/or location of the sensing region 210 may vary depending on actual implementations.

The sensing region 210 includes, or is otherwise coupled to, fingerprint sensors 212, light sources 214, and capacitive sensors 216. In some implementations, the fingerprints sensors 212 may be one example of the fingerprint sensors (associated with the fingerprint scanning region 150) of FIG. 1. Thus, the fingerprint sensors 212 may use capacitive, optical, and/or ultrasonic fingerprint imaging technologies to scan or image a user's finger in the sensing region 210. In some implementations, the light sources 214 may be one example of the light sources 160 of FIG. 1. Thus, the light sources 214 may include LEDs and/or any other suitable light sources capable of emitting visible light or otherwise illuminating the sensing region 210. In some implementations, the capacitive sensors 216 may be one example of the capacitive sensors (associated with the sensing region 120) of FIG. 1. Thus, the capacitive sensors 216 may include an array of sensor electrodes configured to sense changes in capacitance (or an electric field) in and/or around the sensing region 210.

The fingerprint sensors 212, light sources 214, and capacitive sensors 216 are coupled to the authentication module 220. The authentication module 220 may be implemented by, or include at least a portion of, a processing system (such as processing system 110) that controls an operation of the fingerprint sensors 212, the light sources 214, and/or capacitive sensors 216. In some implementations, the authentication module 220 may be configured to implement a multi-factor authentication operation based, at least in part, on authentication inputs received via the fingerprint sensors 212 and the capacitive sensors 216. Further, the authentication module 220 may be configured to guide a user through one or more steps of the multi-factor authentication operation using the light sources 214. In some implementations, the authentication module 220 may include a fingerprint authentication sub-module 222, an illumination control sub-module 224, and a gesture authentication sub-module 226.

The fingerprint authentication sub-module 222 may authenticate a fingerprint as part of the multi-factor authentication operation. For example, the fingerprint authentication sub-module 222 may operate the fingerprint sensors 212 to scan a user's fingerprint. The fingerprint authentication sub-module 222 may further compare the user's fingerprint with one or more fingerprint credentials 232 stored in a user credential repository 230. The fingerprint credentials 232 may include or otherwise indicate a set of identifying features of one or more fingerprints of an authorized user (or multiple authorized users) of the input device 200. For example, the identifying features may include a pattern of ridges and valleys on the surface of the user's finger. The fingerprint credentials 232 may be captured or acquired via the fingerprint sensors 212, and stored in the user credential repository 230, as part of a fingerprint enrollment operation preceding the multi-factor authentication operation. Accordingly, the fingerprint authentication sub-module 22 may authenticate a fingerprint acquired during the multi-factor authentication operation only if the fingerprint matches one or more fingerprint credentials 232 stored in the user credential repository 230.

The gesture authentication sub-module 226 may authenticate a gesture input as part of the multi-factor authentication operation. For example, the gesture authentication sub-module 226 may operate the capacitive sensors 216 to detect a gesture input by an input object (such as the user's finger). The gesture authentication sub-module 226 may further compare the gesture input with one or more gesture credentials 234 stored in the user credential repository 230. The gesture credentials 234 may include or otherwise indicate one or more preconfigured gestures by an authorized user (or multiple authorized users) of the input device 200. For example, the gestures may correspond to a unique pattern of touches, taps, and/or swipes performed in the sensing region 210. The gesture credentials 234 may be captured or acquired via the capacitive sensors 216, and stored in the user credential repository 230, as part of a gesture enrollment operation preceding the multi-factor authentication operation. Accordingly, the gesture authentication sub-module 226 may authenticate a gesture input acquired during the multi-factor authentication operation only if the gesture input matches one or more gesture credentials 234 stored in the user credential repository 230 (e.g., for the same user as the matching fingerprint credential 232).

The illumination control sub-module 224 may operate the light sources 214 to indicate when, where, and/or how to provide the gesture input as part of the multi-factor authentication operation. For example, the illumination control sub-module 224 may selectively activate and deactivate the light sources 214 to indicate the start and end, respectively, of the gesture authentication step of the multi-factor authentication operation. As described above with respect to FIG.

1, the light sources 214 may be arranged or otherwise configured to project a pattern of dots onto an input surface associated with the sensing region 210. In some implementations, the illumination control sub-module 224 may activate the light sources 214, to illuminate at least a portion of the sensing region 210, in response to the fingerprint authentication sub-module 222 authenticating a user's fingerprint. In some other implementations, the illumination control sub-module 224 may deactivate the light sources 214 in response to the gesture authentication sub-module 226 authenticating the user's gesture input. When the user of the input device 200 is successfully authentication by the fingerprint authentication sub-module 222 and the gesture authentication sub-module 226, the authentication module 220 may enable access to and/or control of a corresponding electronic device (not shown for simplicity).

Still further, in some implementations, the illumination control sub-module 224 may alter the illumination of the sensing region 210 in response to the gesture authentication sub-module 226 failing to authenticate the user's gesture input. For example, the illumination control sub-module 224 may change a color or pattern of light emitted by the light sources 214 to notify or otherwise indicate to the user that the authentication attempt has failed. In some aspects, the gesture authentication sub-module 226 may permit a number (N) of failed authentication attempts before terminating the multi-factor authentication operation. After the N authentication attempts have been exhausted, the multi-factor authentication operation may reset. Accordingly, the illumination control sub-module 224 may deactivate the light sources 214 in response to the gesture authentication sub-module 226 failing to authentication the user's gesture input N times in succession.

Figure 3:
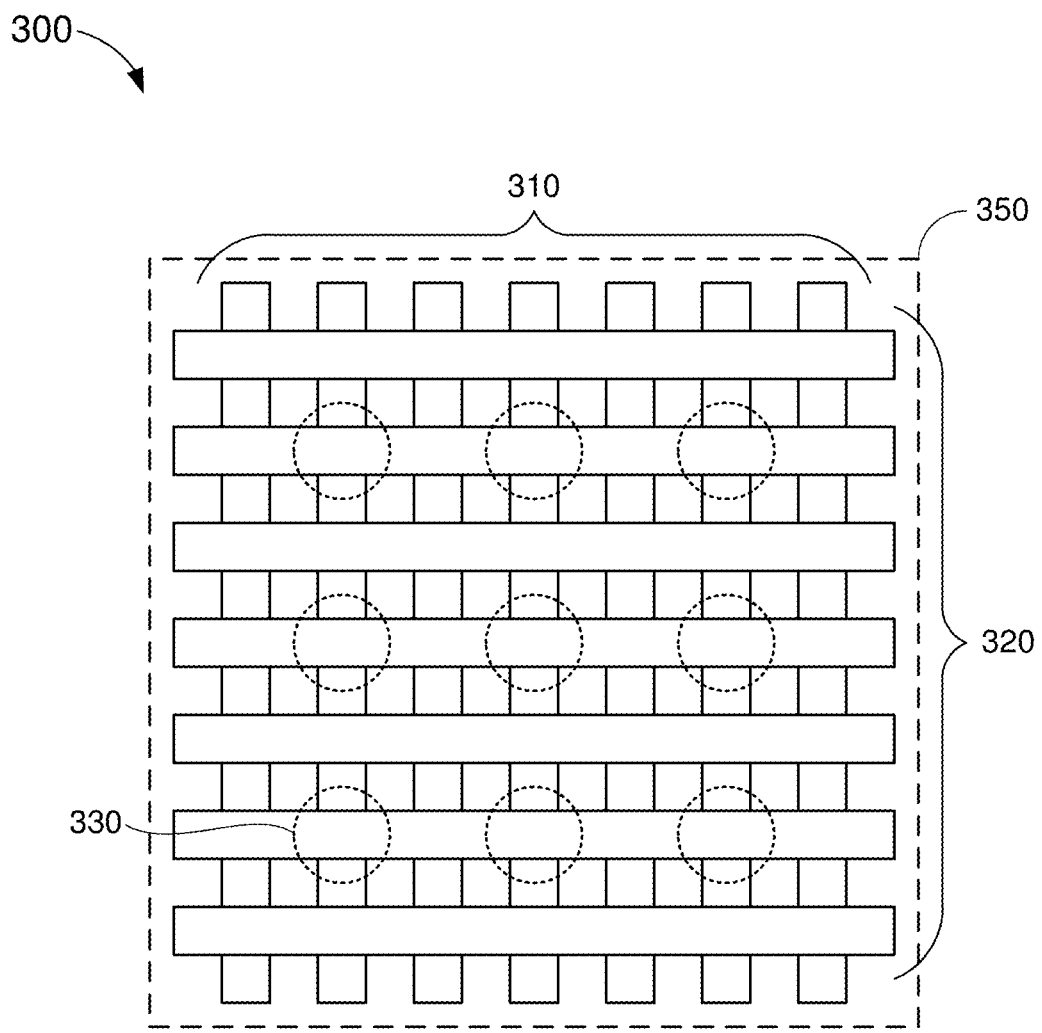
FIG. 3 shows an example sensor configuration, in accordance with some implementations.

FIG. 3 shows an example sensor configuration 300, in accordance with some implementations. The sensor configuration 300 includes a capacitive sensor array formed by a number of sensor electrodes 310 arranged in a vertical pattern and a number of sensor electrodes 320 arranged in a horizontal pattern. The sensor configuration 300 further includes a number of light sources 330 disposed under (or above) the sensor electrodes 310 and 320. In some implementations, the sensor configuration 300 may represent at least a portion of the sensing region 210 of FIG. 2 and/or the sensing region 120 of FIG. 1. Accordingly, the sensor electrodes 310 and 320 may correspond to one or more of the capacitive sensors 216 and the light sources 330 may correspond to one or more of the light sources 214 of FIG. 2.

In the example of FIG. 3, sensor electrodes 310 are shown to extend in a first (e.g., vertical) direction and sensor electrodes 320 are shown to extend in a second (e.g., horizontal) direction. Although the sensor electrodes 310 and 320 are depicted in a perpendicular grid arrangement, in actual implementations the sensor electrodes 310 and 320 may be arranged in other patterns. For example, in other embodiments, the sensor electrodes 310 may be parallel or diagonal to the sensor electrodes 320. Furthermore, each of the sensor electrodes 310 and 320 is shown to have substantially the same shape and size. However, in actual implementations the sensor electrodes 310 and 320 may be of various shapes and/or sizes. As discussed above with respect to FIGS. 1 and 3, sensor electrodes 310 and 320 may be transparent. Further, with respect to FIG. 3, the sensor electrodes 310 and 320 may cover or overlap the light sources 330. In actual implementations, the relative densities and/or pitches of the sensor electrodes 310 and the light sources 330 may be different than what is depicted in FIG. 3.

The sensor electrodes 310 and 320 may detect touch inputs in the sensing region using capacitive sensing techniques. For example, in some implementations, one or more of the sensor electrodes 310 and 320 may be driven with modulated signals to determine changes in the absolute capacitance of the sensor electrodes (e.g., absolute capacitive sensing). In other implementations, a first sensor electrode (e.g., of the sensor electrodes 310 or 320) may be driven with a transmitter signal and a resulting signal may be received on a second sensor electrode (e.g., of the sensor electrodes 310 or 320). Still further, in some implementations, the sensor electrodes 310 and 320 may be configured for a combination of transcapacitance and absolute capacitance sensing. Using capacitive sensing techniques, the sensor electrodes 310 and 320 may detect input objects that are in contact with and/or proximate to an input surface 350 (e.g., such as a finger hovering above the input surface 350).

The light sources 330 may illuminate at least a portion of the input surface 350. Thus, the light sources 330 may include LEDs or any other suitable light sources capable of emitting visible light. In some implementations, the light sources 330 may be configured to project a pattern of dots on the input surface 350. In the example of FIG. 3, the light sources 330 are arranged in a grid pattern such that each light source projects a respective dot onto the input surface 350. However, in other implementations, one or more of the dots may be generated by combining the light from two or more light sources 330. As described above with respect to FIG. 1, the light sources 330 may provide a visual aid for inputting gestures via the sensing region. More specifically, the pattern of dots may indicate a number of discrete regions of the input surface 350 over which the user may trace an input object to perform the gesture.

In some implementations, the sensor configuration 300 may be implemented as part of a touchpad or trackpad. More specifically, the input device may not include an electronic display capable of providing detailed information and/or instructions to a user. For example, in some aspects, the input surface 350 may be at least partially opaque. Because the input device lacks an electronic display, the light sources 330 may function as a simple or rudimentary user interface (UI) through which the input device may communicate information and/or instructions to the user. For example, the light sources 330 may be used to communicate when, where, and/or how to provide a gesture-based authentication input as part of a multi-factor authentication operation.

Figure 4:
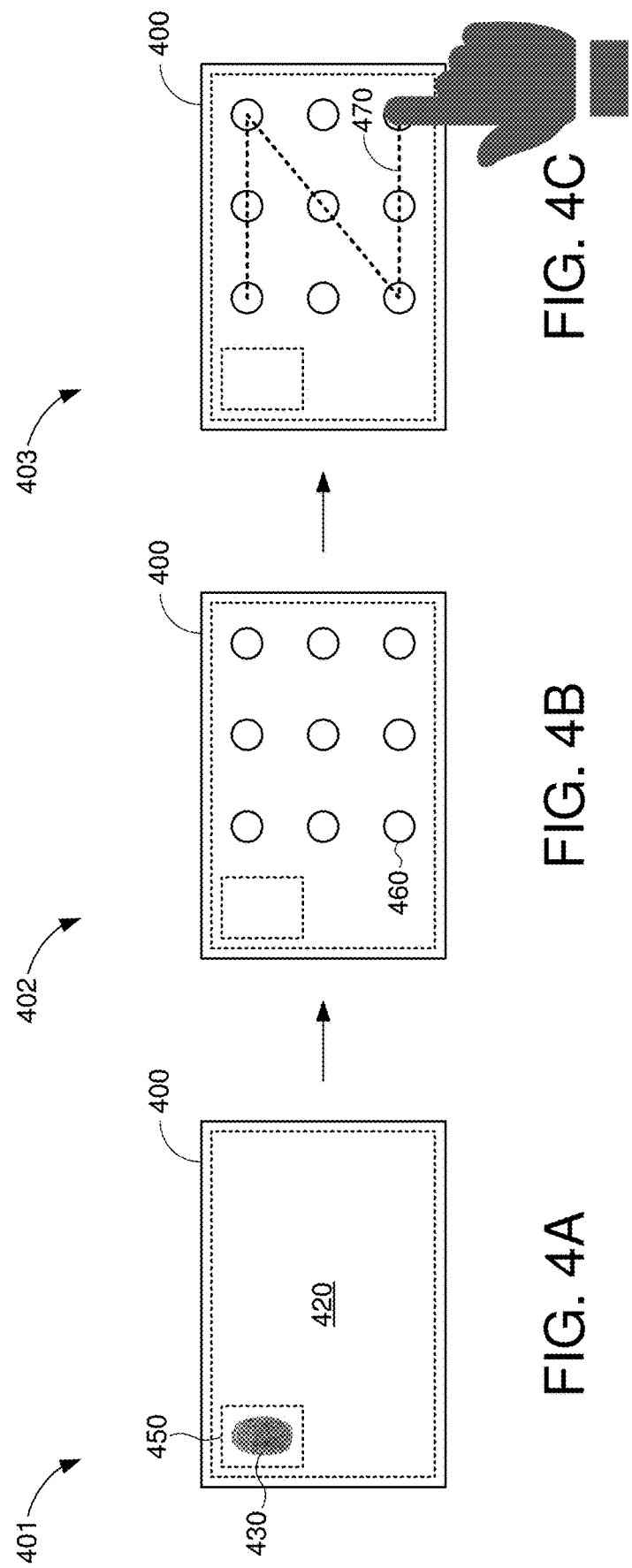
FIGS. 4A-4C show an example input device in various stages of a multi-factor authentication operation, in accordance with some implementations.

FIGS. 4A-4C show an example input device 400 in various stages 401-403, respectively, of a multi-factor authentication operation, in accordance with some implementations. The input device 400 includes a sensing region 420, a fingerprint scanning region 450, and a number of light sources 460. In some implementations, the input device 400 may be one example of the input device 100 of FIG. 1 or the input device 200 of FIG. 2. Thus, the sensing region 420, fingerprint scanning region 450, and light sources 460 may be examples of the sensing region 120, fingerprint scanning region 150, and light sources 160, respectively, of FIG. 1.

In a first stage 401 of the multi-factor authentication operation, the input device 400 detects a fingerprint 430 in the fingerprint scanning region 450. As shown in FIG. 4A, the fingerprint scanning region 450 is disposed in the upper-left corner of the input device 400, overlapping the sensing region 420. In some other implementations, the fingerprint scanning region 450 may be disposed elsewhere on the input device 400 (e.g., not overlapping the sensing region 420). The input device 400 may compare the detected fingerprint 430 to one or more stored fingerprint credentials associated with an authorized user. If the fingerprint 430 does not match any of the stored fingerprint credentials, the input device 400 may terminate the multi-factor authentication operation and prevent the user from accessing a corresponding electronic system. If the fingerprint 430 matches at least one of the stored fingerprint credentials, the input device 400 may proceed to a second stage 402 of the multi-factor authentication operation.

In the second stage 402 of the multi-factor authentication operation, the input device 400 may activate the light sources 460 to illuminate the sensing region 420. As shown in FIG. 4B, the input device 400 includes nine discrete light sources 460 arranged in a grid pattern. In some other implementations, the input device 400 may include fewer or more light sources than those depicted in FIG. 4B. Still further, in some implementations, the arrangement or pattern of the light sources 460 may be different than what is shown in FIG. 4B. As described above with respect to FIGS. 1 and 3, the light sources 460 may project a pattern of dots onto an input surface associated with the sensing region 420 to indicate when, where, and/or how to provide a gesture-based authentication input. Thus, in the second stage 402 of the multi-factor authentication operation, the input device 400 may be configured to receive gesture inputs via the sensing region 420.

In a third stage 403 of the multi-factor authentication operation, the input device 400 detects a gesture input 470 in the sensing region 420. As shown in FIG. 4C, the gesture input 470 is in the shape of a "Z," intersecting seven of the dots projected by the light sources 460. In some other implementations, various other gesture inputs 470 may be provided (e.g., depending on the user). The input device 400 may compare the detected gesture input 470 to one or more stored gesture credentials associated with the authorized user. If the gesture input 470 matches a stored gesture credential associated with the authorized user, the input device 400 may successfully authenticate the user and enable access and/or control of the electronic system. In some implementations, the input device 400 may deactivate the light sources 460 in response to determining that the gesture input 470 matches a stored gesture credential.

If the gesture input 470 does not match any of the stored gesture credentials, the input device 400 may require the user to repeat the current step of the multi-factor authentication operation (e.g., by providing another gesture input via the sensing region 420). In some implementations, the input device 400 may alter the illumination emitted by the light sources 460 in response to determining that the gesture input 470 does not match any of the stored gesture credentials. For example, the input device 400 may change the color, intensity, or pattern of light emitted by the light sources 460. In some aspects, the input device 400 may permit a number (N) of failed gesture-based authentication attempts before terminating the multi-factor authentication operation. In some implementations, the input device 400 may further deactivate the light sources 460 upon terminating the multi-factor authentication operation.

Figure 5:
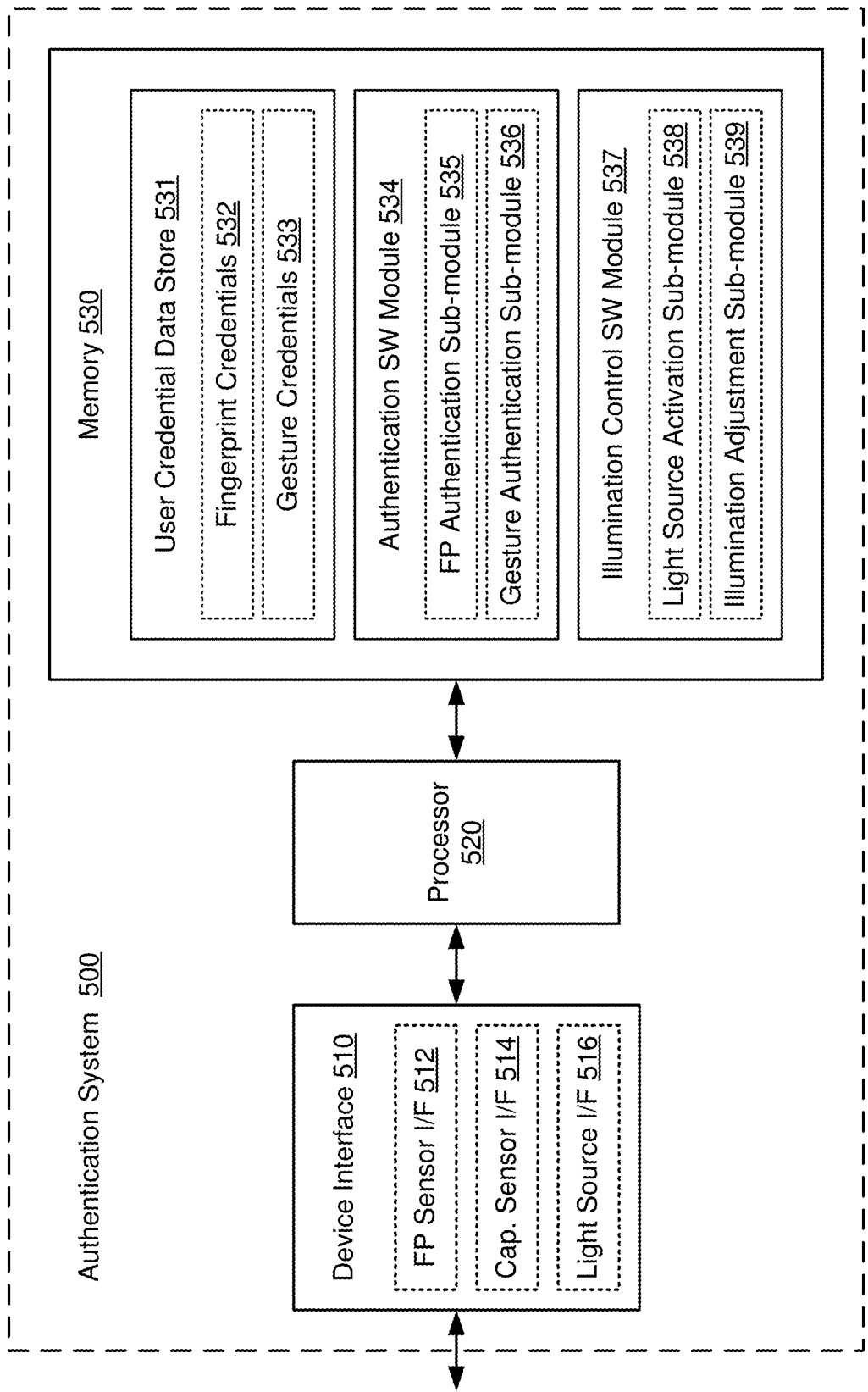
FIG. 5 shows a block diagram of an authentication system, in accordance with some implementations.

FIG. 5 shows a block diagram of an authentication system 500, in accordance with some implementations. In some implementations, the authentication system 500 may be one example of the processing system 110 of FIG. 1 and/or the authentication module 220 of FIG. 2. Accordingly, the authentication system 500 may include a device interface 510, a processor 520, and a memory 530.

The device interface 510 includes a fingerprint (FP) sensor interface (I/F) 512, a capacitive sensor interface 514, and a light source interface 516. The FP sensor interface 512 may be used to communicate with one or more fingerprint sensors of an input device (such as the fingerprint sensors 212 of FIG. 2). For example, the FP sensor interface 512 may transmit activation signals to, and receive fingerprint sensor data from, one or more fingerprint sensors to capture or acquire a user's fingerprint. The capacitive sensor interface 514 may be used to communicate with one or more capacitive sensors of the input device (such as the capacitive sensors 216 of FIG. 2). For example, the capacitive sensor interface 516 may transmit signals to, and receive capacitive sensing signals from, one or more capacitive sensors to detect inputs in a sensing region of the input device. The light source interface 516 may be used to communicate with one or more light sources of an input device (such as the light sources 214 of FIG. 2). For example, the light source interface 514 may transmit control and/or activation signals to one or more light sources to activate, deactivate, and/or adjust the illumination of the light sources.

The memory 530 includes a user credential data store 531 to store a set of user credentials for one or more authorized users. In some implementations, the user credential data store 531 may store one or more fingerprint credentials 532 for each of the authorized users. In some other implementations, the user credential data store 531 may store one or more gesture credentials 533 for each of the authorized users. The memory 530 may further include a non-transitory computer-readable medium (e.g., one or more nonvolatile memory elements, such as EPROM, EEPROM, Flash memory, a hard drive, and so on) that may store at least the following software (SW) modules:

an authentication SW module 534 to implement a multi-factor authentication scheme, the authentication SW module 534 including:
        a fingerprint (FP) authentication sub-module 535 to authenticate a fingerprint received via the fingerprint sensor interface 512 by comparing the fingerprint to one or more of the fingerprint credentials 532; and
        a gesture authentication sub-module 536 to authenticate a gesture input received via the capacitive sensor interface 514 by comparing the gesture input with one or more of the gesture credentials 533; and
    an illumination control SW module 537 to control an output of the one or more light sources of the input device, the illumination control SW module 537 including:
        a light source activation sub-module 538 to selectively activate the light sources based on the results of the comparisons performed by the fingerprint authentication sub-module 535 and the gesture authentication sub-module 536; and
        an illumination adjustment sub-module 539 to selectively alter the color, intensity, or pattern of illumination emitted by the light sources based, at least in part, on the results of the comparison performed by the gesture authentication sub-module 536.

Each software module includes instructions that, when executed by the processor 520, cause the authentication system 500 to perform the corresponding functions. The non-transitory computer-readable medium of memory 530 thus includes instructions for performing all or a portion of the operations described below with respect to FIGS. 6 and 7.

The processor 520 may be any suitable one or more processors capable of executing scripts or instructions of one or more software programs stored in the authentication system 500 (e.g., within the memory 530). For example, the processor 520 may execute the authentication SW module 534 to implement a multi-factor authentication scheme. In executing the authentication SW module 534, the processor 520 may also execute the fingerprint authentication sub-module 535 and/or the gesture authentication sub-module 536 to authenticate a gesture input received via the capacitive sensor interface 514 by comparing the gesture input with one or more of the gesture credentials 533. For example, the processor 520 may execute the fingerprint authentication sub-module 535 to authenticate a fingerprint received via the fingerprint sensor interface 512 by comparing the fingerprint to one or more of the fingerprint credentials 532. Further, the processor 520 may execute the gesture authentication sub-module 536 to authenticate a gesture input received via the capacitive sensor interface 514 by comparing the gesture input with one or more of the gesture credentials 533.

The processor 520 may also execute the illumination control SW module 537 to control an output of the one or more light sources of the input device. In executing the illumination control SW module 537, the processor 520 may further execute the light source activation sub-module 538 and/or the illumination adjustment sub-module 539. For example, the processor 520 may execute the light source activation sub-module 538 to selectively activate the light sources based on the results of the comparisons performed by the fingerprint authentication sub-module 535 and the gesture authentication sub-module 536. Further, the processor 520 may execute the illumination adjustment sub-module 539 to selectively alter the color, intensity, or pattern of illumination emitted by the light sources based, at least in part, on the results of the comparison performed by the gesture authentication sub-module 536.

Figure 6:
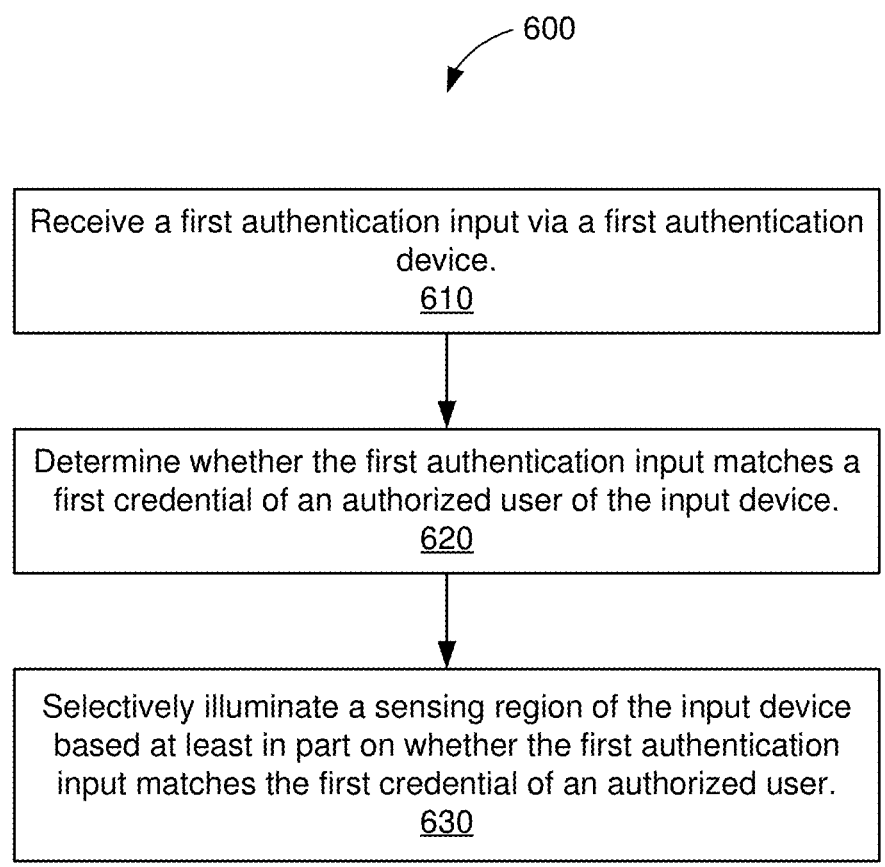
FIG. 6 shows an illustrative flowchart depicting an example authentication operation, in accordance with some implementations.

FIG. 6 shows an illustrative flowchart depicting an example authentication operation 600, in accordance with some implementations. With reference for example to FIG. 1, the operation 600 may be performed by the input device 100 to implement at least part of a multi-factor authentication scheme.

The input device receives a first authentication input via a first authentication device (610). In some implementations, the first authentication device may be a fingerprint sensor and the first authentication input may represent a fingerprint of a user of the input device. With reference for example to FIG. 1, the first authentication input may be detected when the user places a finger on the fingerprint scanning region 150.

The input device determines whether the first authentication input matches a first credential of an authorized user of the input device (620). The fingerprint credentials may include or otherwise indicate a set of identifying features of one or more fingerprints of an authorized user (or multiple authorized users) of the input device. For example, the identifying features may include a pattern of ridges and valleys on the surface of the user's finger. The fingerprint credentials may be captured or acquired via the fingerprint sensor and stored in a user credential repository (such as the user credential repository 230 of FIG. 2) as part of a fingerprint enrollment operation preceding the multi-factor authentication operation 600.

The input device may selectively illuminate a sensing region of the input device based at least in part on whether the first authentication input matches the first credential of an authorized user (630). As described above, one or more light sources may be disposed beneath an input surface of the input device. The light sources may be used to indicate when, where, and/or how to perform a subsequent (e.g., gesture-based) step of the multi-factor authentication operation. In some implementations, the input device may activate the light sources, to illuminate the sensing region, in response to determining that the detected fingerprint matches a fingerprint credential of an authorized user.

Figure 7:
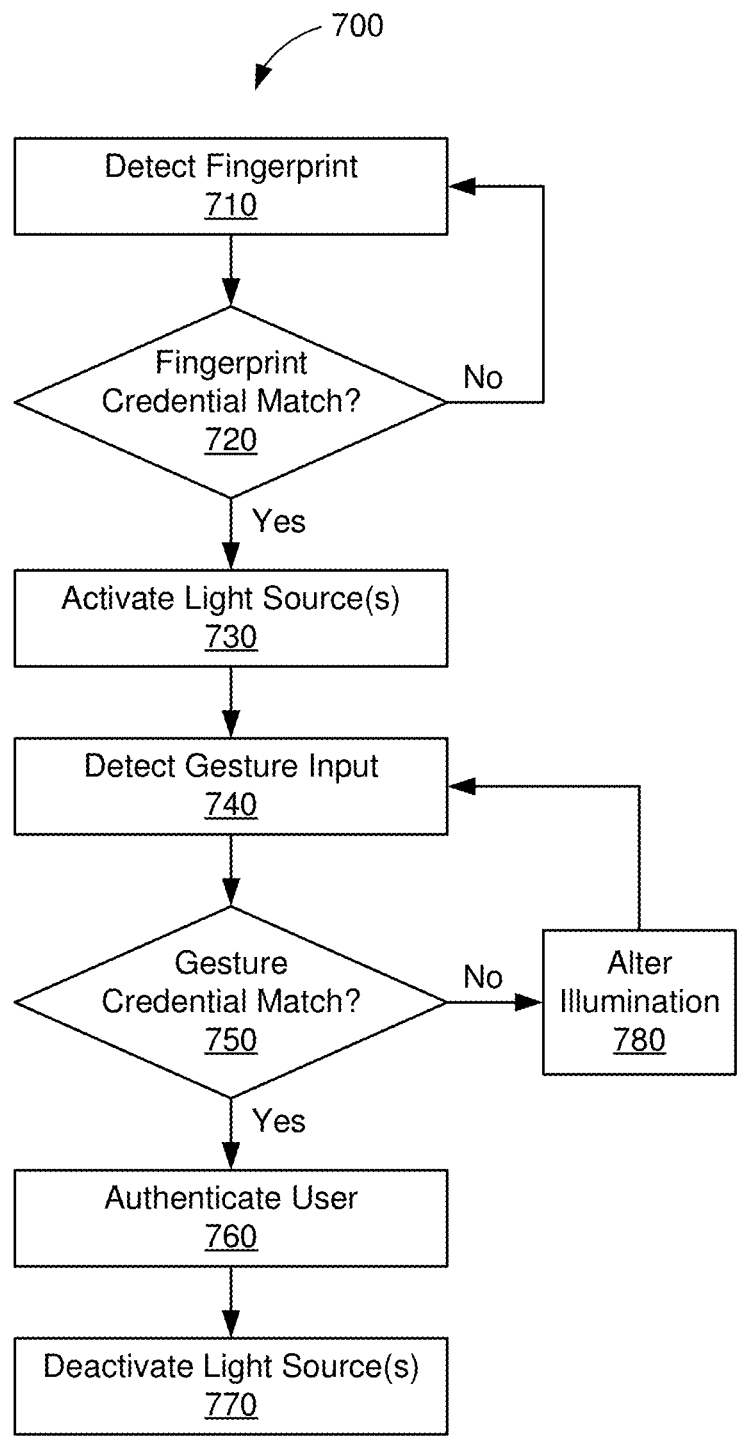
FIG. 7 shows an illustrative flowchart depicting an example multi-factor authentication operation, in accordance with some implementations.

FIG. 7 shows an illustrative flowchart depicting an example multi-factor authentication operation 700, in accordance with some implementations. With reference for example to FIG. 2, the operation 600 may be performed by the input device 200.

The input device detects a fingerprint (710) and determines whether the fingerprint matches a stored fingerprint credential for an authorized user (720). If the fingerprint does not match any of the stored fingerprint credentials (as tested at 720), the input device may terminate or reset the multi-factor authentication operation 700.

If the fingerprint matches a stored fingerprint credential for an authorized user (as tested at 720), the input device may proceed to activate one or more light sources disposed beneath an input surface associated with a sensing region (730). The input device further detects a gesture input via the sensing region (740) and determines whether the gesture input matches a stored gesture credential for the authorized user (750). If the gesture input does not match a stored gesture credential for the authorized user (as tested at 750), the input device may alter the illumination emitted by the light sources (780) and require the user to enter another gesture input (740).

If the gesture input matches a stored gesture credential for the authorized user (as tested at 750), the input device may proceed to authenticate the user (760). For example, the input device may enable the user to access and/or control an electronic system coupled to, or otherwise associated with, the input device. The input device may further deactivate the light sources (770) upon authenticating the user.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, implementations have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An input device that does not include an electronic display, the input device comprising:
    a plurality of sensor electrodes configured for capacitive sensing in a sensing region of the input device; and
    an authentication component configured to:
        receive a first authentication input via a first authentication device;
        determine whether the first authentication input matches a first credential associated with a first authentication factor of a multi-factor authentication operation that controls access to an electronic system; and
        selectively activate one or more light sources associated with a second authentication factor of the multi-factor authentication operation based at least in part on whether the first authentication input matches the first credential, the one or more light sources being configured to illuminate at least a portion of the sensing region of the input device configured to receive a second authentication input.

2. The input device of claim 1, wherein the first authentication device comprises a fingerprint sensor, and wherein the first authentication input represents a fingerprint.

3. The input device of claim 1, wherein the authentication component is configured to activate the one or more light sources responsive to determining that the first authentication input matches the first credential of an authorized user.

4. The input device of claim 1, further comprising:
    an input surface associated with the sensing region, wherein the plurality of sensor electrodes and the one or more light sources are disposed behind the input surface.

5. The input device of claim 4, wherein the first authentication device is also disposed behind the input surface.

6. The input device of claim 5, wherein the one or more light sources are configured to illuminate the sensing region by projecting a plurality of dots onto the input surface.

7. The input device of claim 1, wherein the authentication component is further configured to:
    receive the second authentication input via the plurality of sensor electrodes responsive to activating the one or more light sources;
    determine whether the second authentication input matches a second credential associated with the second authentication factor of the multi-factor authentication operation; and
    selectively enable access to the electronic system based at least in part on whether the second authentication input matches the second credential.

8. The input device of claim 7, wherein the authentication component is further configured to:
    deactivate the one or more light sources responsive to determining that the second authentication input matches the second credential.

9. The input device of claim 7, wherein the authentication component is further configured to:
    alter the illumination of the sensing region responsive to determining that the second authentication input does not match the second credential.

10. The input device of claim 9, wherein the authentication component is configured to alter the illumination of the sensing region by changing a color or pattern of light emitted by at least one of the light sources.

11. A method of authentication performed by an input device that does not include an electronic display, the method comprising:
    receiving a first authentication input via a first authentication device;
    determining whether the first authentication input matches a first credential associated with a first authentication factor of a multi-factor authentication operation that controls access to an electronic system; and
    selectively illuminating a sensing region of the input device associated with a second authentication factor of the multi-factor authentication operation based at least in part on whether the first authentication input matches the first credential, wherein the sensing region is provided at least in part by a plurality of sensor electrodes configured to receive a second authentication input.

12. The method of claim 11, wherein the first authentication device comprises a fingerprint sensor, and wherein the first authentication input represents a fingerprint.

13. The method of claim 11, wherein the sensing region is illuminated responsive to determining that the first authentication input matches the first credential of an authorized user.

14. The method of claim 11, wherein the plurality of sensor electrodes is disposed behind an input surface associated with the sensing region, and wherein the illuminating comprises:
    activating one or more light sources disposed behind the input surface.

15. The method of claim 14, further comprising:
    receiving the second authentication input via the plurality of sensor electrodes responsive to activating the one or more light sources;
    determining whether the second authentication input matches a second credential associated with the second authentication factor of the multi-factor authentication operation; and
    selectively enabling access to the electronic system based at least in part on whether the second authentication input matches the second credential.

16. The method of claim 15, further comprising:
    deactivating the one or more light sources responsive to determining that the second authentication input matches the second credential; and
    altering the illumination of the sensing region responsive to determining that the second authentication input does not match the second credential.

17. The method of claim 16, wherein the altering of the illumination comprises:
    changing a color or pattern of light emitted by at least one of the light sources.

18. An authentication system comprising:
    a processing system; and
    a memory storing instructions that, when executed by the processing system, causes the authentication system to:

receive a first authentication input via a first authentication device;
determine whether the first authentication input matches a first credential of associated with a first authentication factor of a multi-factor authentication operation that controls access to an electronic system; and
selectively illuminate a sensing region of an input device associated with a second authentication factor of the multi-factor authentication operation based at least in part on whether the first authentication input matches the first credential, wherein the input device does not include an electronic display and the sensing region is provided at least in part by a plurality of sensor electrodes configured to receive a second authentication input.

19. The authentication system of claim 18, wherein execution of the instructions further causes the authentication system to:

receive the second authentication input via the plurality of sensor electrodes responsive to illuminating the sensing region;
determine whether the second authentication input matches a second credential associated with the second authentication factor of the multi-factor authentication operation; and
selectively enable access to the electronic system based at least in part on whether the second authentication input matches the second credential.

20. The authentication system of claim 19, wherein execution of the instructions for further causes the authentication system to:

deactivating the one or more light sources responsive to determining that the second authentication input matches the second credential; and
altering the illumination of the sensing region responsive to determining that the second authentication input does not match the second credential.

* * * * *